Figure 1:
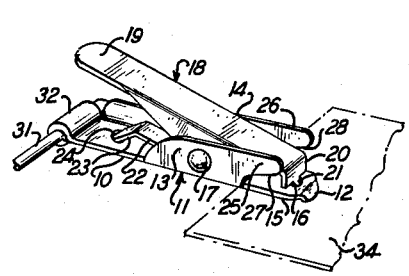

Aug. 13, 1963         A. W. BUCK         3,100,326
POSITIVE RELEASE FILM CLIP
Filed Aug. 30, 1960

INVENTOR
ARTHUR W. BUCK
BY
ATTORNEYS

United States Patent Office 3,100,326
Patented Aug. 13, 1963

3,100,326
POSITIVE RELEASE FILM CLIP
Arthur W. Buck, 8709 Xograph Ave., St. Louis, Mo.
Filed Aug. 30, 1960, Ser. No. 52,862
1 Claim. (Cl. 24—252)

This invention relates to film handling and more particularly to a positive release film clip primarily intended for use in facilitating the processing of X-ray film, but which may also be utilized in connection with the handling or processing of other types of photographic films and in certain instances, might also be applicable in connection with other types of sheet material.

In the processing of X-ray film it is common practice to secure each sheet of film in a frame commonly termed a hanger and which facilitates handling of the film during developing and fixing operations and such hangers are normally provided with spring clips or other securing means for attaching a sheet of film thereto in a flat relatively tight or stretched condition. The film is normally retained in the hanger until completion of the developing and fixing operations and usually the film is retained in the hanger until after the same has been dried, whereupon the film is removed from the frame for viewing and study purposes.

Heretofore various types of clips have been utilized to secure sheets of film in a film hanger and while many of these clips have been perfectly satisfactory insofar as retaining the film in place is concerned, some difficulty has been experienced in conveniently engaging the edges of the film with the clips and considerable difficulty has been experienced in promptly and conveniently releasing the film from the clips when it is desired to remove the same from the hanger. During the processing of the film, the emulsion on the surface of the film becomes softened and as a consequence, the film tends to stick to the clips utilized for securing the same in the hanger and as a result, when it is desired to remove the film from the hanger, considerable difficulty has been experienced in freeing the film from the clips thereby introducing an inconvenience which materially increases the processing time for such film and, therefore, the cost.

It is accordingly an object of the invention to provide a positive release film clip which may be conveniently utilized on a film hanger for engaging and securing a sheet of film therein and in which means is provided for preventing sticking of the film to the clip upon release therefrom.

A further object of the invention is the provision of a positive release film clip having means for piercing and engaging a sheet of film to secure the clip thereto and in which means is provided for stripping the film from the clip upon operation thereof to release the film therefrom.

A still further object of the invention is the provision of a positive release film clip for use on film hangers to engage and clamp a sheet of film therein, in which means is provided to automatically strip the film from the clip upon operation of the clip to release the film therefrom, such means also serving to facilitate insertion of an edge of the sheet of film between the clamping jaws of the clip.

Another object of the invention is the provision of a positive release film clip for use in conventional film hangers and which may be applied to such hangers without modification thereof.

Figure 3:
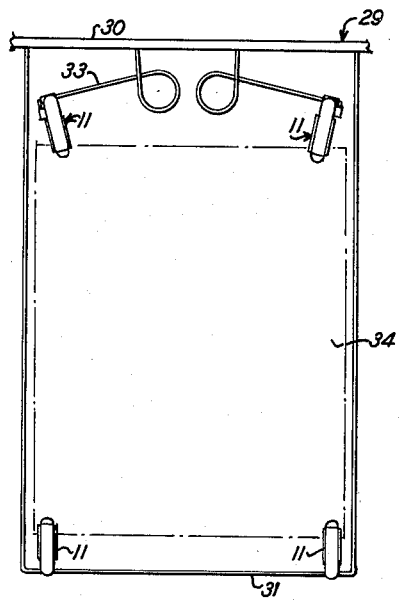
Figure 2:
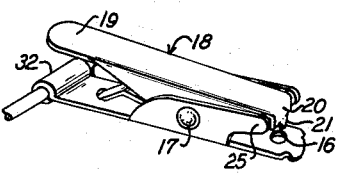
Figure 4:
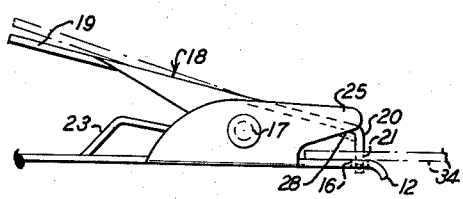
Figure 5:
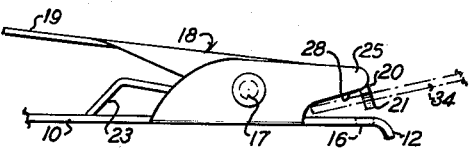
Figure 6:
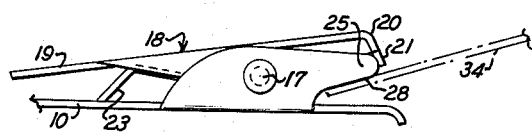

Further objects and advantages of the invention will be apparent from the following description taken in conjunction with the accompanying drawing wherein:

FIG. 1 is a view in perspective showing a positive release film clip constructed in accordance with this invention and with a sheet of film shown in dotted outline and engaged by the clip;

FIG. 2, a view similar to FIG. 1, but with the film clamping jaw in film releasing position;

FIG. 3, an elevational view showing a film clip constructed in accordance with this invention and installed on a conventional film hanger;

FIG. 4, a side elevational view showing the manner in which the jaw and prong of the film clip of this invention engages a film to securely clamp the same in place on the clip;

FIG. 5, a view similar to FIG. 4, but with the clip operated to partially disengage the same from the film; and FIG. 6, a view similar to FIG. 5, but showing the clip operated to strip the film from the clamping jaw and prong and release the same from the clip.

With continued reference to the drawing, there is shown a positive release film clip constructed in accordance with this invention and which may well comprise an elongated substantially flat base member 10 which may be formed of metal, plastic or any other suitable material. The forward end of the base member 10 of the clip 11 is provided with a downwardly curved tab 12 and intermediate the length of the base 10 there are provided upwardly extending substantially parallel ears 13 and 14 on opposite sides of the base 10. The forward portion 15 of the base 10 provides one jaw of the clip and such forward portion is provided with an aperture 16, the purpose of which will presently appear.

A pivot pin 17 extends through the ears 13 and 14 and serves to pivotally mount therebetween an elongated clip member 18 which is provided with a rearwardly extending finger engaging portion 19 and which terminates at the forward end in a downwardly extending jaw 20 which is disposed opposite the jaw portion 15 of the base 10. A prong 21 extends downwardly from the jaw 20 and is received in the aperture 16 when the clip member 18 is in film clamping position as shown in FIGS. 1 and 4. A leaf spring 22 is disposed between the base 10 and the clip member 18 and engages the clip member 18 to urge the same into film clamping position as shown in FIGS. 1 and 4. The leaf spring 22 may be provided with a tang 23 received in an aperture 24 in the base 10 to retain the spring 22 in position. While a leaf spring has been shown and described, it is to be understood that a coil spring or other equivalent resilient means may also be utilized to urge the clip member 18 into film clamping position.

The ears 13 and 14 are provided with forwardly extending fingers 25 and 26 terminating substantially in alignment with the jaw portion 15 of the base 10 and also substantially in alignment with the jaw 20 on the clip member 18. The lower surfaces 27 and 28 of the fingers 25 and 26 are inclined with respect to the jaw portion 15 of the base 10 and spaced therefrom and provide a throat for facilitating insertion of the edge of a sheet of film between the fingers 25 and 26 and the jaw portion 15 of the base 10. Downwardly turned tab 12 also facilitates such insertion of an edge of a sheet of film.

The film clip of this invention is normally utilized in connection with a film hanger to support a sheet of film during developing and fixing thereof or during other processing steps and in FIG. 3, there is shown a conventional film hanger 29 which may well comprise a top supporting bar 30, to which is secured a generally rectangular wire frame 31. The film clip 11 may be provided with means 32 adjacent the rear end of the base 10 to facilitate securing of the base 10 and clip 11 to the wire frame 31 of the hanger 29 and this same means 32 may also be utilized to secure a clip 11 to a spring member 33 fixed to the supporting bar 30 of the film hanger 29. As shown in FIG. 3, two spring members 33 may be employed and the clips mounted thereon, together with the clips on the wire frame 31 serve to engage a sheet of film 34 and maintain the same in a stretched condition during processing thereof.

As best shown in FIGS. 1 and 4, the edge of a sheet of film 34 is disposed between the fingers 25 and 26 and the jaw portion 15 of the base 10 and the prong 21 on the jaw 20 of the clip member 18 pierces the film and the film is further clamped in position by engagement of the jaw 20 therewith to clamp the film in engagement with the jaw portion 15 of the base 10. This serves to securely hold the sheet of film in place during processing or other operation. During processing of the sheet of film 34, the emulsion coating thereon becomes softened and this causes the sheet of film to stick to the jaw 20 of the clip member 18 and furthermore, the film is tightly engaged by the prong 21 piercing the same. Consequently, upon pivotal movement of the clip member 18 to release the sheet of film 34 from the clip results in moving the sheet of film upwardly with the jaw member 20 and prong 21 as clearly shown in FIG. 5, but the structure of this invention provides means for stripping the sheet of film from the prong 21 and jaw 20 in order to facilitate release thereof from the clip. This stripping of the sheet of film 34 from the prong 21 and jaw 20 is accomplished as shown in FIGS. 5 and 6 by engagement of the edge of the sheet of film 34 with the lower surfaces 27 and 28 of the fingers 25 and 26, such engagement being shown in FIG. 5, and continued pivotal movement of the clip member 18 as shown in FIG. 6 resulting in completely stripping the sheet of film from the prong 21 and jaw 20, thereby releasing the film sheet from the clip without any special attention or activity on the part of the user.

It will thus be seen that by the above described invention there has been provided a relatively simple positive release film clip which may be utilized to secure a sheet of film in a film hanger, but which may be quickly and conveniently released from the film when desired, merely by actuating the pivotally mounted clip member, which by reason of the fingers 25 and 26 will operate to automatically strip the film from the clip thereby permitting quick and convenient handling of the film during processing operations.

It will be obvious to those skilled in the art that various changes may be made in the invention without departing from the spirit and scope thereof and therefore the invention is not limited by that which is shown in the drawing and described in the specification, but only as indicated in the appended claim.

What is claimed is:

A positive release film clip comprising a substantially flat thin generally rectangular base member having side flanges intermediate the ends of said base member extending upwardly from opposite side edges thereof and defining a channel therebetween, each of said flanges comprising a main section integral with said base member and a forwardly extending projecting finger having a lower surface tapered downwardly in the direction of said main section, said lower surfaces extending vertically parallel to and in spaced relation above said opposite side edges respectively, an elongated generally rectangular clip member, said clip member having flanges extending downwardly from opposite side edges thereof and disposed in juxtaposition to said side flanges on said base member, a pivot pin extending through aligned apertures in all said flanges to pivotally mount said clip member in the channel between said side flanges on said base member, said clip member having a rearwardly extending finger engaging portion and a forwardly extending portion terminating in a downwardly extending film engaging jaw, a downwardly extending film piercing prong integrally fixed on said jaw, said base member having an aperture for receiving said prong when said clip member is in film clamping position, said base member and said clip member having lengths substantially exceeding their widths, spring means disposed between said clip member and said base member for urging said jaw toward said base member, said lower surface of each of said fingers being aligned with the lower surface of the other of said fingers to provide aligned tapered throats extending under said clip member on opposite sides of said base member whereby upon operation of said clip member to move said jaw away from said base member, said lower surfaces will engage film within said throats and strip the same from said prong, the forward end of said base member extending forwardly past said film engaging jaw and being curved away from said clip member immediately in advance of the forward end of said throats to provide a guide into said throats.

References Cited in the file of this patent
UNITED STATES PATENTS

| | | |
|---|---|---|
| 1,955,575 | Buck | Apr. 17, 1934 |
| 2,387,471 | Simpson | Oct. 23, 1945 |
| 2,893,777 | O'Neill et al. | July 7, 1959 |

FOREIGN PATENTS

| | | |
|---|---|---|
| 59,527 | Netherlands | June 16, 1947 |